(12) United States Patent
Whang et al.

(10) Patent No.: US 6,349,308 B1
(45) Date of Patent: Feb. 19, 2002

(54) INVERTED INDEX STORAGE STRUCTURE USING SUBINDEXES AND LARGE OBJECTS FOR TIGHT COUPLING OF INFORMATION RETRIEVAL WITH DATABASE MANAGEMENT SYSTEMS

(75) Inventors: Kyu-Young Whang, Taejon-si; Byung-Kwon Park, Seoul; Wook-Shin Han, Taegu-si; Young-Koo Lee, Taejon-si, all of (KR)

(73) Assignee: Korea Advanced Institute of Science & Technology, Taejon (KR)

( * ) Notice: Subject to any disclaimer, the term of this patent is extended or adjusted under 35 U.S.C. 154(b) by 0 days.

(21) Appl. No.: 09/250,487

(22) Filed: Feb. 15, 1999

(30) Foreign Application Priority Data

Feb. 25, 1998 (KR) .............................. 98-5930

(51) Int. Cl.[7] .............................................. G06F 17/00
(52) U.S. Cl. ........................... 707/107; 707/1; 707/2; 707/3; 707/4; 707/5; 707/180
(58) Field of Search .................. 707/3, 1–10, 101, 707/107, 100

(56) References Cited

U.S. PATENT DOCUMENTS

| | | | | |
|---|---|---|---|---|
| 4,611,272 A | * | 9/1986 | Lomet ........................... 707/3 |
| 5,263,155 A | * | 11/1993 | Wang ............................. 707/8 |
| 5,307,486 A | * | 4/1994 | Nakamigawa .................. 707/2 |
| 5,685,003 A | * | 11/1997 | Peltonen et al. ............ 707/531 |
| 5,761,688 A | * | 6/1998 | Morishita .................... 707/532 |
| 5,806,065 A | * | 9/1998 | Lomet ........................... 707/8 |
| 5,852,822 A | * | 12/1998 | Srinivasan et al. ............ 707/4 |
| 5,893,104 A | * | 4/1999 | Srinivansan et al. ........ 707/102 |
| 5,915,249 A | * | 6/1999 | Spencer .......................... 707/5 |
| 6,029,170 A | * | 2/2000 | Garger et al. ................. 707/100 |
| 6,061,690 A | * | 5/2000 | Nori et al. .................... 707/103 |
| 6,073,144 A | * | 6/2000 | Van Hoff ..................... 707/513 |
| 6,119,156 A | * | 9/2000 | Filion et al. ................. 709/220 |
| 6,167,397 A | * | 12/2000 | Jacobson et al. ............... 707/5 |
| 6,243,718 B1 | * | 6/2001 | Klein et al. .................. 707/203 |

OTHER PUBLICATIONS

Salton, Gerard, Automatic Text Processing, The Transformation, Analysis, and Retrieval of Information by Computer, 1988, Addison–Wesley Press, pp. 206–208, 229–240.*

Bilisis, Alexandros, The Performance of Three Database Storage Structures for Managing Large Objects, 1992, ACM, pp. 276–285.*

Tomasic, Anthony, Incremental Updates of Inverted Lists for Text Document Retrieval, 1994, ACM, pp. 289–300.*

Defazio, Samuel, Integrating IR and RDBMS Using Cooperative Indexing, 1995, ACM.*

Cutting, Doug, Optimization for Dynmic Inverted Index Maintenance, 1990, ACM. pp. 401–411.*

Stonebraker, Michael, Document Processing in a Relational Database System, 1983, ACM, pp. 143–158.*

* cited by examiner

*Primary Examiner*—John Breene
*Assistant Examiner*—Debbie M Le
(74) *Attorney, Agent, or Firm*—Bachman & LaPointe, P.C.

(57) ABSTRACT

This invention relates to an inverted index storage structure that indexes keyword inputs into the storage space for the corresponding posting lists. In particular, the invention relates to the index structure that enables fast retrieval of the posting of the specific document from the posting list and enables efficient arrangement and maintenance of the posting list in document identifier (docID) order, so that fast addition, deletion, modification, and retrieval of documents are possible in environments where a database management system is tightly coupled with information retrieval. The technical solution is to store the posting list in a large object and map to each posting list a subindex that indexes the docID into the postings containing the docID.

9 Claims, 7 Drawing Sheets

Prior Art

INVERTED INDEX STORAGE STRUCTURE USING SUBINDEXES AND LARGE OBJECTS FOR TIGHT COUPLING OF INFORMATION RETRIEVAL WITH DATABASE MANAGEMENT SYSTEMS

BACKGROUND OF THE INVENTION

1. Field of the Invention

The present invention relates to a new inverted index storage structure for dynamic document databases that can maintain document identifier (docID) order in the posting list upon frequent insertion, deletion, and modification of documents and that enables fast search for the posting of a specific document from a long posting list.

The invented storage structure uses large objects and subindexes. A large object stores a database object whose size exceeds one disk page and dynamically adjusts the storage space upon insertion and deletion. A large object typically employs a tree structure for dynamic allocation of space. We store each posting list in a large object and create a subindex on each posting list. A large object manages variable storage space of its posting list upon document addition and deletion. A subindex having docID as the key is used for docID-order preservation of a posting list upon document addition and for removal of a posting from a posting list upon document deletion.

2. Description of the Prior Art

A document can have several attributes such as the document number, modification date, authors, abstract, and body. Some of these attributes have a structured data type such as integer and character string, while others have an unstructured data type such as text, image, audio, and video. Document retrieval based on the attributes of the text data type is traditionally well performed by an information retrieval system, while document retrieval based on the attributes of structured data types by a database management system. Thus, for document retrieval based on the attributes of both text and structured data types, tight coupling of the database management system and information retrieval is necessary. In addition, the database management system can provide consistent management of documents and their indexes upon document addition, deletion, and modification.

Inverted index is an index used for information retrieval, which retrieves documents containing keywords given by a user. Inverted index keeps a list of postings for each keyword extracted from documents. A posting of a keyword consists of a document identifier (docID) and a list of locations in the document where the keyword occurs[Frakes, W. B. and Baeza-Yates, R., *Information Retrieval—Data Structures & Algorithms*, Prentice Hall, Englewood Cliffs, N.J., 1992.; Salton G., *Automatic Text Processing—The Transformation, Analysis,* and *Retrieval of Information by Computer*, Addison-Wesley Press, 1988.]. The number of postings of a keyword, i.e., the number of documents containing the keyword, is called the document frequency, and the number of occurrences of a keyword in a document is called the term frequency. The document frequency indicates the length of the posting list of a keyword, and the term frequency the length of a posting. Information retrieval using inverted index is done by retrieving the posting list of the keyword given by a user. Thus, inverted index needs a storage structure to find the posting list of a keyword fast.

The storage space for the posting list increases when new postings of an added document are inserted into the posting list, while it decreases when old postings of a deleted document are removed from the posting list. Document modification also affects the length of the posting list because the old document is deleted and the modified document is added. Thus, inverted index needs a storage structure for managing variable storage space of the posting list efficiently.

If posting lists are kept in the order of docIDs, the boolean expression containing more than one keyword can be efficiently processed by sequentially scanning and merging the posting lists of the keywords only once. The query "find the documents about multimedia and database," for example, contains two keywords of "multimedia" and "database," and is processed by sequentially scanning and merging the posting lists of "multimedia" and "database."

In document databases where document addition or modification is frequent, inverted index is dynamically updated on adding or modifying documents. On updating the inverted index, new postings of the added document should be inserted into the posting list in the order of docIDs. Thus, inverted index needs a storage structure to insert new postings efficiently into the posting list in the order of docIDs.

Document deletion is frequent because modifying a document requires deleting the old document before adding the modified document. If a document is deleted from a document database, all the postings of the deleted document should also be removed from the inverted index. Thus, the inverted index needs the following two storage structures: one for finding all the posting lists where the postings of the deleted document are included; the other for searching the posting list to find the posting of the deleted document. Because many keywords having long posting lists are contained in most documents, searching a long posting list or a specific posting is an important part of the performance in document deletion.

The simplest method for storing an inverted index is to store a table of records consisting of a keyword and a posting in a database. This method, however, is known to have low query performance and to require excessive storage space due to redundancy of keywords [Stonebraker, M., "Document Processing in a Relational Database System," *ACM Trans. on Office Information Systems*, Vol. 1, No. 1, pp. 143–158, 1983; DeFazio, S., Daoud, A., Smith, L. A., and Srinivasan, J., "Integrating IR and RDBMS Using Cooperative Indexing," *In Proc. Int'l Conf. on Information Retrieval*, ACM SIGIR, pp. 84–92, Seattle, 1995.].

Therefore, a lot of studies have been done on the method using tree structures instead of database tables for storing inverted indexes. FIG. 1 shows such a conventional inverted index storage structure. The reference numeral 10 shows a B+-tree having the keywords as the key. A pointer to a posting list is stored at the pointer field of the index entry in the leaf node of the tree. The reference numeral 11 shows the storage space for the posting list. Samuel DeFazio et al. [DeFazio, S., Daoud, A., Smith, L. A., and Srinivasan, J., "Integrating IR and RDBMS Using Cooperative Indexing," In *Proc. Int'l Conf. on Information Retrieval*, ACM SIGIR, pp. 84–92, Seattle, 1995.] argued through experiments that this storage structure out performs the database table method in query performance and storage space. Doug Cutting [Cutting, D. and Pedersen, J., "Optimizations for Dynamic Inverted Index Maintenance," In *Proc. Int'l Conf. on Information Retrieval*, ACM SIGIR, pp. 405–411, Brussels, 1990.], Christos Faloutsos [Faloutsos, C. and Jagadish, H. V., "On B-tree Indices for Skewed Distribution," In *Proc. Int'l Conf. on Very Large Data Bases*, pp. 363–374, Vancouver, 1992.], and Anthony Tomasic [Tomasic, A., Garcia-Molina, H., and Shoens, K., "Incremental Updates of Inverted Lists for Text Document Retrieval," In *Proc. Int'l Conf. on Management of Data,* ACM SIGMOD, pp. 289–300, Minneapolis, 1994.] studied the problem of storage space allocation for the reference numeral 11 when the posting list continuously increases due to document addition.

The conventional storage structures for the inverted index, however, have the following drawbacks: 1) They do not consider maintaining the docID-order in the posting list when inserting a new posting into the posting list upon document addition. Thus, boolean expressions involving more than one keyword are not evaluated efficiently. 2) They consider only adding but not removing the postings from the posting lists. Thus, document deletion is not properly handled. 3) They do not provide fast access to the posting for a specific document in a posting list. They simply assume sequential search, which requires reading half of the posting list on the average.

SUMMARY OF THE INVENTION

The inverted index is an index used for information retrieval (IR), i.e., for retrieving documents containing the keywords given by the user. The inverted index maintains a list of postings for each keyword extracted from the documents. Insertion, deletion, and modification of documents entail dynamic update of the inverted index. Thus, the inverted index needs a storage structure for effectively managing the posting lists, which is of variable size and is potentially long. We also need an inverted index structure to support integrated database and information retrieval queries by processing the IR part of the query using the result of the database part of the query and vice versa in a database management system (DBMS) tightly coupled with information retrieval. In this patent, we solve these problems by inventing an inverted index structure using the subindex and the large object management scheme.

First, we store a long posting list in a large object and manage storage space using the large object management scheme. Thus, when a new posting is inserted in a long posting list or when an existing posting is deleted, there is no physical movement of other postings, which results in effective extension and shrinkage of the long posting list and thus in enhanced update performance.

Second, we construct the subindex on document identifiers (docID) for long posting lists. The subindex is used for finding fast the locations of postings that have a given docID in a long posting list. Thus, we can enhance the performance when storing new postings into the posting list in the order of docID's, or when deleting postings of the deleted documents from the posting list. The performance of inserting and deleting postings in/from a long posting list is of importance since most documents contain keywords having long posting lists. Moreover, if postings are stored in a posting list in the order of docID's, Boolean queries consisting of more than one keyword can be efficiently processed. Last, we store the database object ID together with docID in each posting. An object ID points to the database object that has attribute data of the document. Then, integrated processing is possible of the IR part of the query and of the database part of the query using the docId and the object ID. That is, when we process the IR part of the query first, we can process the database part of the query by accessing the desired database object through the object ID stored in the posting. Likewise, when we process the database part of the query first, we can process the IR part of the query by looking for the desired posting through the subindex—using the docID stored in the database object—in the posting list of the given keyword. The IR part of the query in the latter checks whether a designated document (with docID) has the given keyword.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

The objects, characteristics and advantages of the present invention will be more clearly understood through the preferable embodiments referring to the attached drawings.

Since the terms mentioned later are judged based upon the function of the present invention and they can be changed according to the technician's intention or a usual practice, the terms should be judged considering the overall contents of the specification of the present invention.

First, the technical principle of the present invention will be briefly described. Electronic documents must be consistently managed under environments where the dynamic addition, deletion and modification thereof are frequently made. This requires database management system functions such as concurrent control, damage recovery, etc.

The retrieval of a document is classified into the retrieval of structured data and the retrieval of unstructured data, i.e., the structured data retrieval is well supported by a database management system, and the text data retrieval is well supported by an information retrieval system. As a result, for the consistent management and integrated retrieval of documents, it is necessary to tightly couple information retrieval with a database management system.

In a tightly coupled system, an inverted index structure must be able to be efficiently updated when documents are dynamically added to, deleted from and modified in a database. Further, an information retrieval based on the inverted index structure and a database retrieval of structured data must be able to be processed by in an integrated manner.

Figure 1:
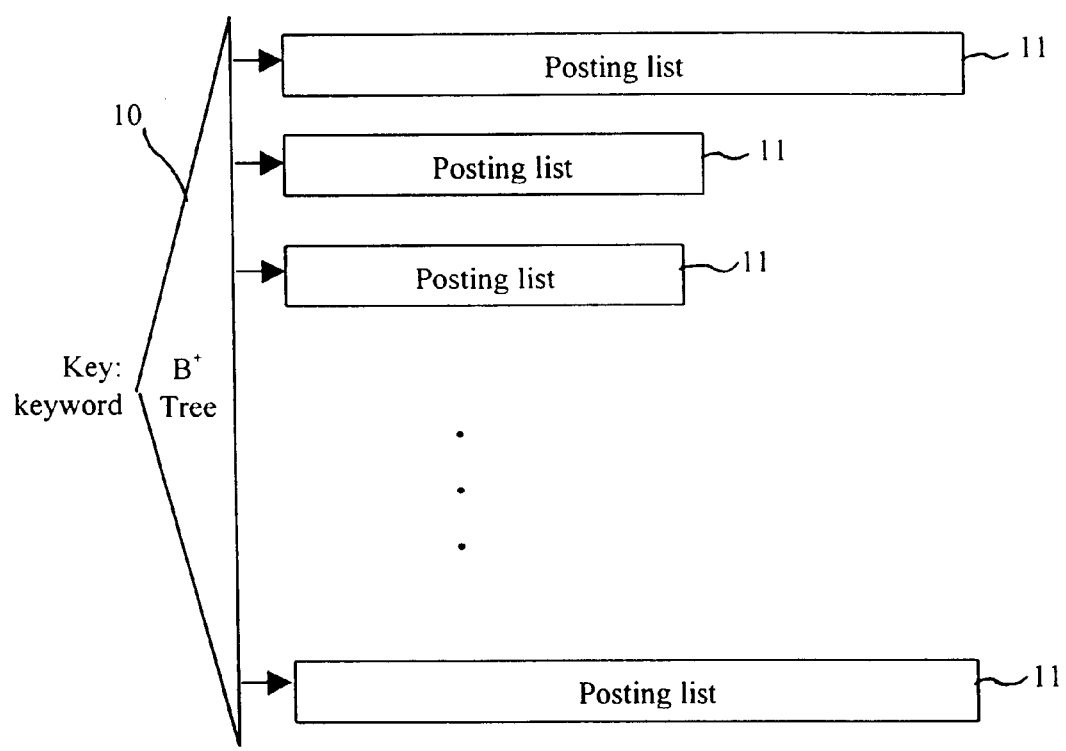
FIG. 1 is a diagram of the conventional inverted index storage structure.
Figure 2:
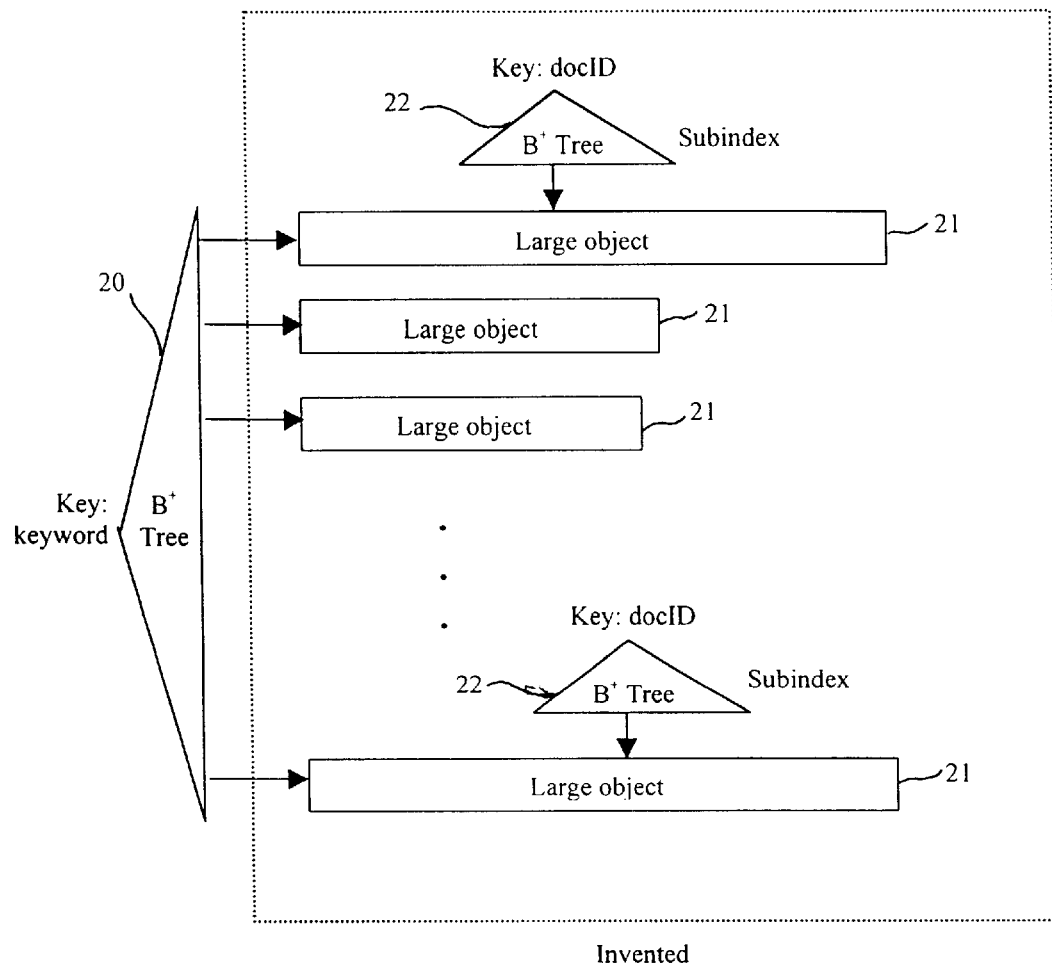
FIG. 2 is the overall structure of the new storage structure of inverted index.

FIG. 2 shows an overall picture of the new inverted index storage structure. The reference numeral 20 is a B+-tree index having keyword as the key. It is used for retrieving the large object 21 that stores the posting list of a given keyword. A large object is a database object whose size exceeds one disk page. An object containing full text, image, audio, or video typically becomes a large object. We store each posting list as a large object and manage the storage space of the posting list using the large object management technique. The advantage of this method is the small number of disk page movement needed to insert a new posting into the posting list or to remove a posting from the posting list. Biliris [Biliris, A., "The Performance of Three Database Storage Structures for Managing Large Objects," In *Proc. Int'l Conf. on Management of Data*, ACM SIGMOD, pp. 276–285, New York, 1992.] shows in his paper that the large object management technique of the EXODUS storage system [Carey, M. et al., "Object and File Management in the EXODUS Extensible Database System," In *Proc. Intl. Conf. on Very Large Data Bases*, pp. 91–106, Kyoto, Japan, August 1986.] can handle the size variation of large objects most efficiently. We adopted the techniques of the EXODUS system, but we can adopt any other techniques developed for large object management.

The reference numeral 22 in FIG. 2 is the subindex created on each large object that stores a posting list. The subindex is used for maintaining the docID-order in the posting list, and for locating a specific posting with a given docID within a posting list. Using subindexes, a new posting is quickly inserted into the posting list in the order of docIDs upon document addition, and an existing posting is quickly deleted from the posting list upon document deletion. Thus, the subindex enhances the performance of document addition or deletion. In practice, however, the subindex is not always created. It is created only for those posting lists exceeding certain size to avoid additional storage overhead of the subindex.

Figure 3:
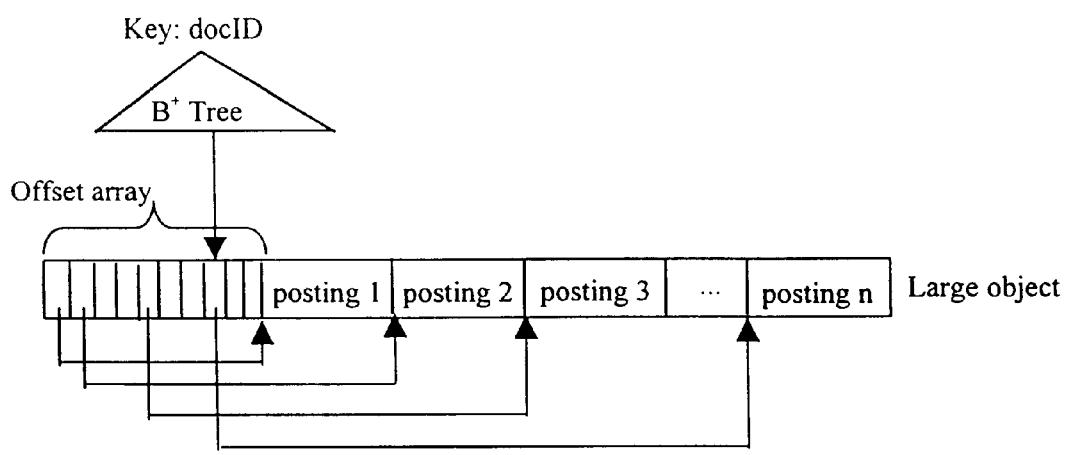
FIG. 3 is the detailed structure of the subindex illustrating the offset array technique.

FIG. 3 shows the detailed storage structure of a subindex. A subindex has docID as the primary key and each leaf entry points to each posting of the posting list stored in a large object. If a leaf entry points directly to a posting, when a posting is inserted into or deleted from the middle of a large object, to keep the posting list in the order of docID, the locations of all the postings located after the affected posting must be changed. In this case, the update cost of the subindex can be high because a posting's insertion or deletion requires update of all the pointers of the subindex to the postings located after the posting inserted or deleted. We use a technique of the offset array to solve this problem. In FIG. 3, the offset array is positioned at the head of each posting list. Each element of the array contains the offset of its posting. The offset of a posting is the byte offset from the end of the offset array to the start of the posting and is not affected by the size of the offset array. When a posting's location is changed, only the corresponding element of the offset array is updated, but the subindex is not affected because it now points to the offset array's element that knows the actual location of the posting.

Figure 4:
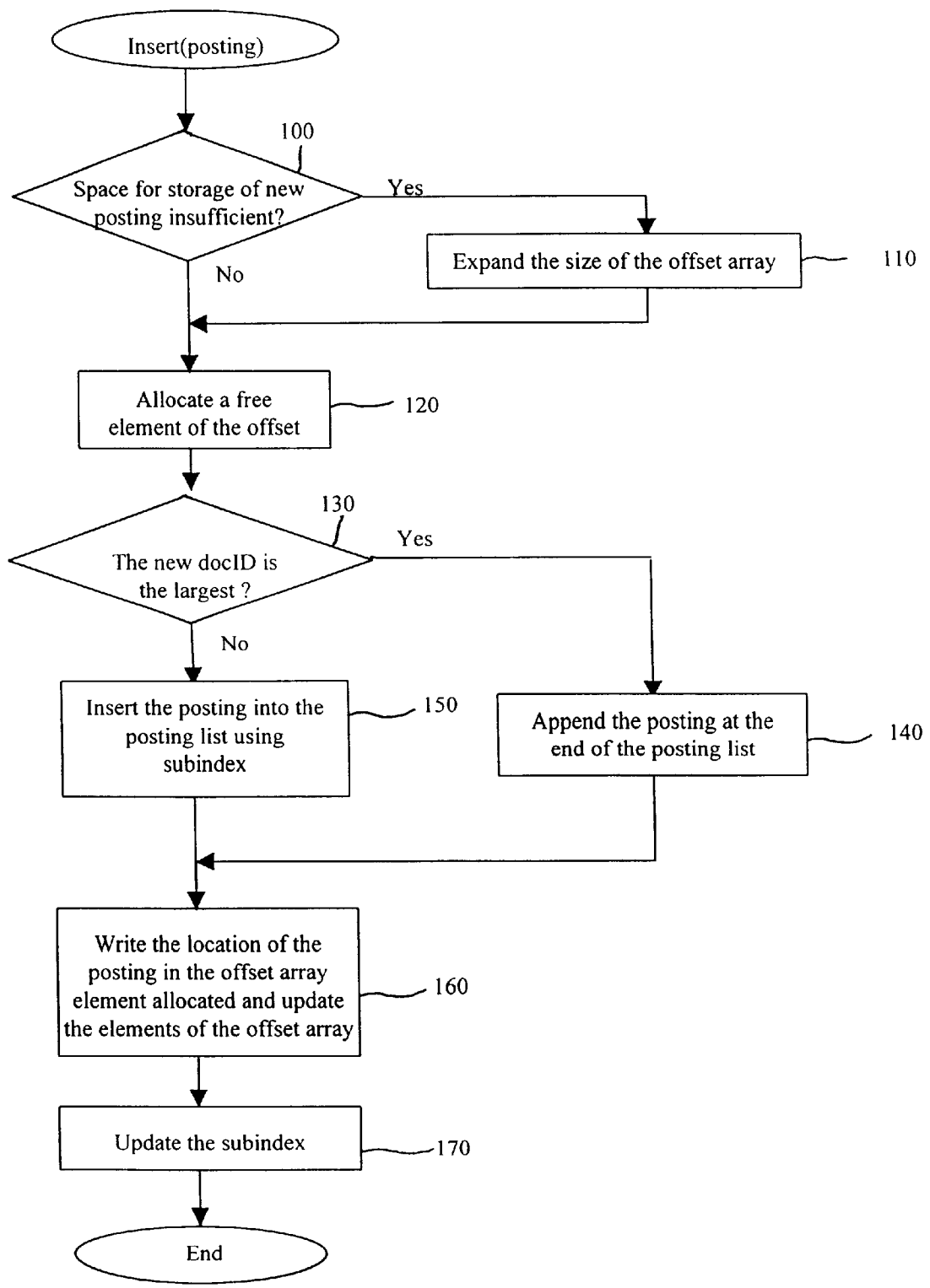
FIG. 4 is the algorithm for inserting a new posting into a posting list on adding a new document.

FIG. 4 shows the algorithm of inserting a new posting of an added document into the posting list. In step 100, we check the offset array to see if there is a free element for the new posting. If there is no such element, we expand the size of the offset array in step 110. Otherwise, we allocate a free element in step 120. In step 130, we compare the docID of the new posting with the docIDs of existing postings. If the former is larger, we append the new posting at the end of the posting list in step 140. Otherwise, we insert the new posting into posting list at the location determined by traversing the subindex in step 150. The insertion changes the locations of all the postings stored after the inserted posting, but there are no physical movements of postings owing to the large object management technique [Biliris, A., "The Performance of Three Database Storage Structures for Managing Large Objects," In *Proc. Int'l Conf. on Management of Data*, ACM SIGMOD, pp. 276–285, New York, 1992.]. In step 160, the location of the posting is written in the offset array element allocated in step 120, and all the elements of the offset array affected by the insertion are updated. Finally, in step 170, the subindex is updated to point to the offset array element of the new posting.

Figure 5:
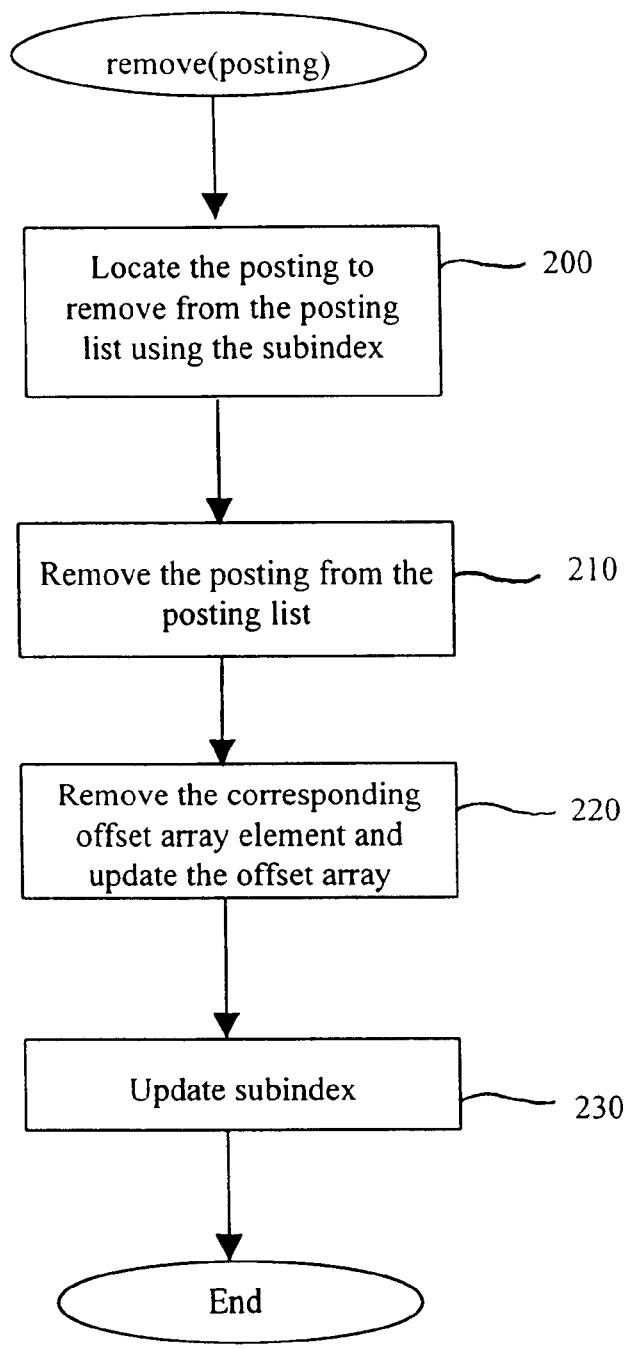
FIG. 5 is the algorithm for removing a posting from a posting list on deleting a document.

FIG. 5 shows the algorithm of removing a posting of a deleted document from the posting list. In step 200, we traverse the subindex to find the location of the deleted document's posting. In step 210, we remove the posting found from the posting list. The removal changes the locations of all the postings stored after the removed posting, but there are no physical movements of postings due to the large object management technique [Biliris, A., "The Performance of Three Database Storage Structures for Managing Large Objects," In *Proc. Int'l Conf. on Management of Data*, ACM SIGMOD, pp. 276–285, New York, 1992.]. In step 220, the offset array element corresponding to the deleted posting is removed and freed, and all the elements of the offset array affected by the removal are updated. Finally, in step 230, the subindex is updated to delete the pointer to the offset array element deleted. The offset array element freed is managed by a free list and reused later.

Figure 6:
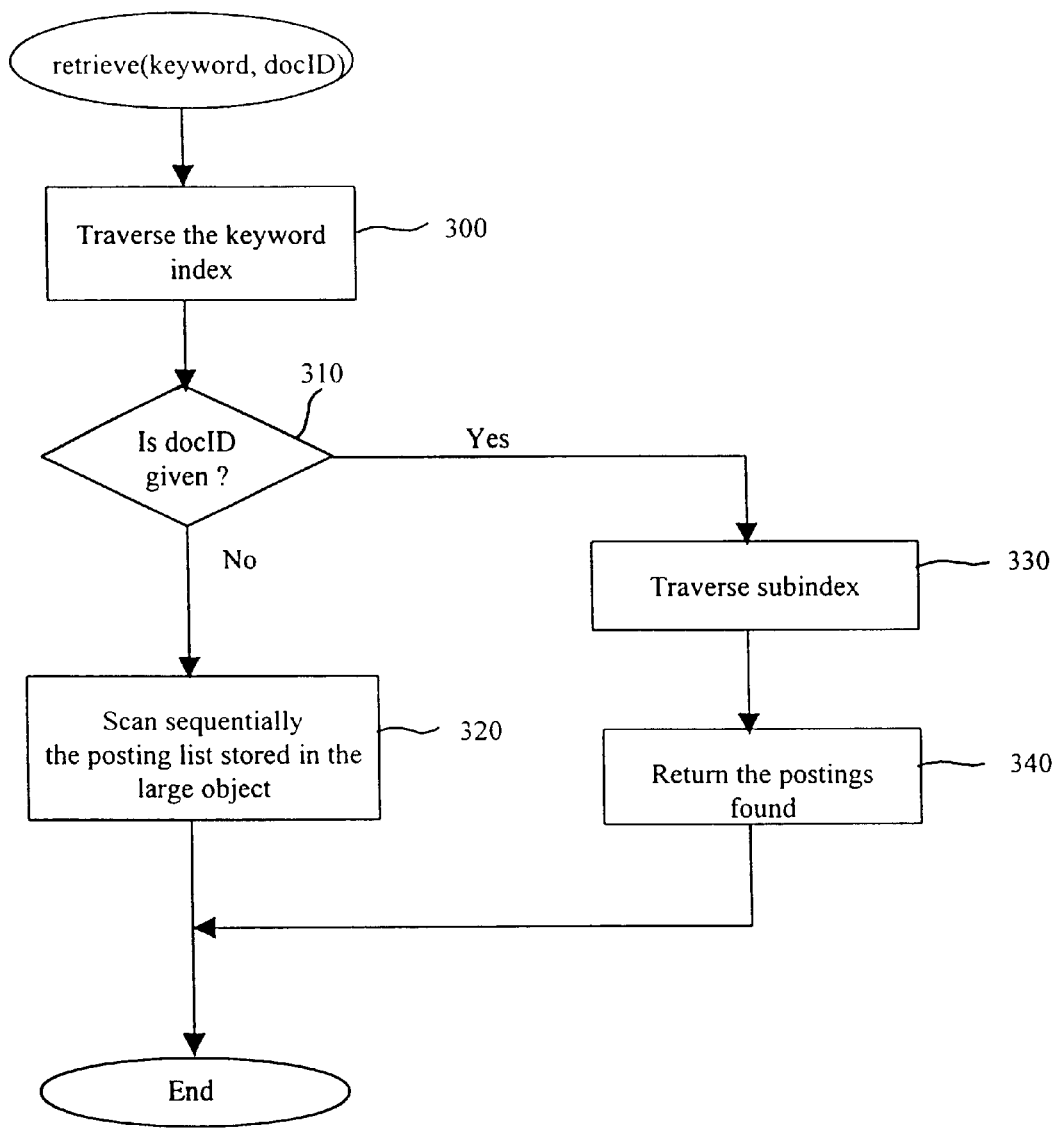
FIG. 6 is the algorithm for retrieving a posting or a posting list for information retrieval.

FIG. 6 shows the algorithm of retrieving a posting or a posting list for information retrieval. In step 300, we traverse the keyword index to find the large object containing the posting list of the keyword. If a specific docID is not given in step 310, the large object is sequentially read to return all the postings of the given keyword in step 320. If a specific docID is given in step 310, we traverse the subindex to locate that specific docID's postings in step 330, and return the postings found in step 340.

Figure 7:
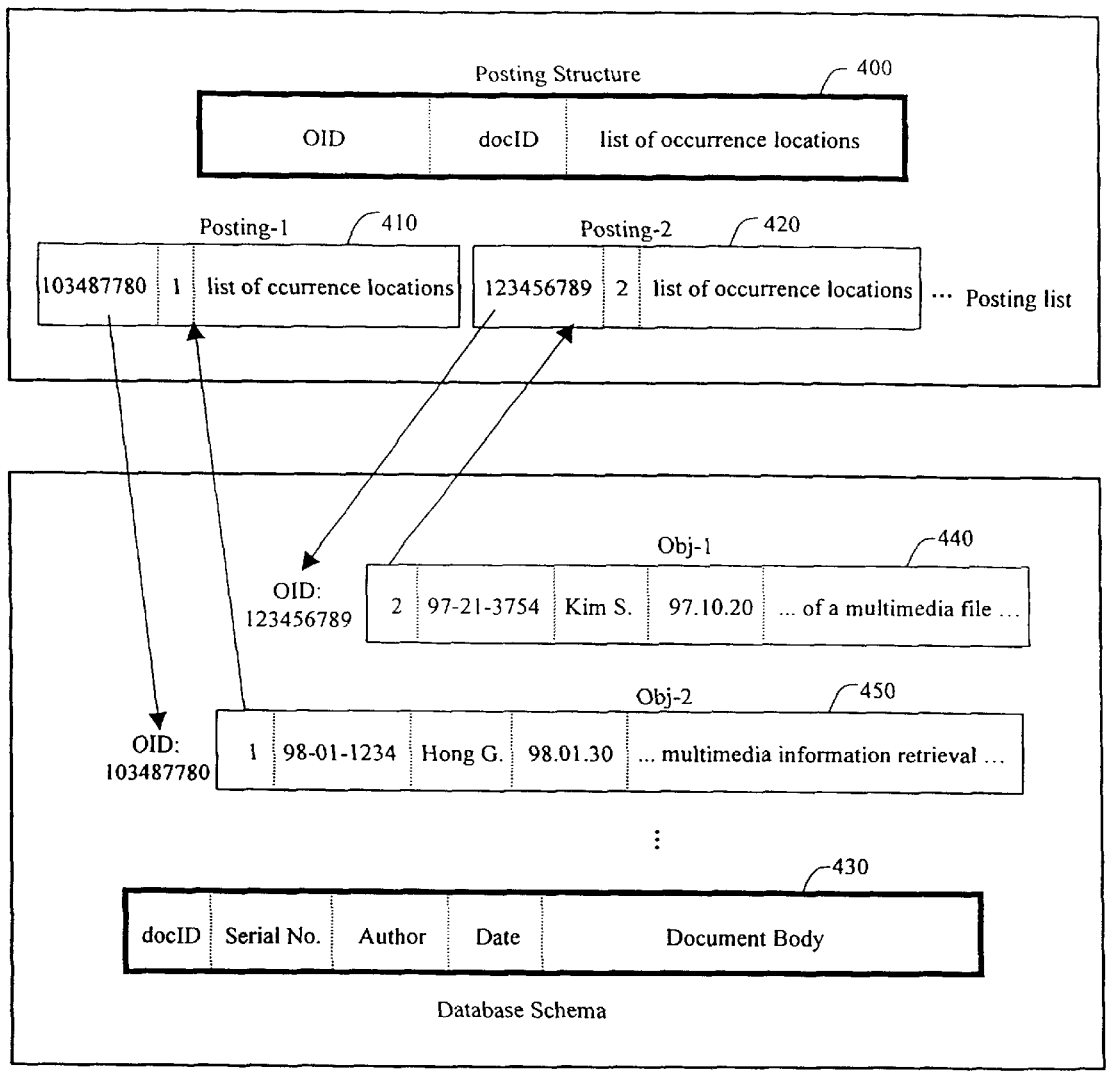
FIG. 7 is the method of tightly coupling information retrieval with a database management system.

FIG. 7 shows the method of processing the integrated database and information retrieval queries using the logical document identifier (called docID) and the database object identifier(OID) . The docID is used for ordering postings in the posting list, and the OID managed by the DBMS is the identifier of the database object containing the document's attributes. We hold both a docID and an OID in each posting. We illustrate the process using an example. In FIG. 7, there are two postings, posting-1 (the reference numeral 410) and posting-2 (the reference numeral 420), and two database objects, obj-1 (the reference numeral 440) and obj-2 (the reference numeral 450). The reference numeral 400 shows the structure of postings, and the reference numeral 430 shows the schema of database objects having the document's attribute data. Posting-1 is the posting for the document obj-1., and posting-2 is the posting for the document obj-2. Posting-1 and posting-2 contain the OID's of obj-1 and obj-2, respectively. Obj-1 and obj-2 contain the docID's of posting-1 and posting-2, respectively. If we get a posting after processing the information retrieval part of the query, we can process the database part of the query by accessing the database objects directly with the OID contained in the posting. If we get a database object after processing the database part of the query, we can process the information retrieval part of the query by retrieving the posting with the docID contained in the database object. The posting is retrieved by searching the subindex defined on the posting list of the specified keyword using the docID as the key. As a result, we can process the integrated query.

As apparent from the above description, the present invention provides the inverted index storage structure using the subindexes and large objects, which can obtain the following advantages.

First, we can support efficient update of the posting list upon document addition, deletion, and modification. We treat each posting list as a large object and manage the storage space by the large object management techniques to efficiently handle the size variation of the posting list when updating an inverted index. Although a posting is inserted into or removed from the middle of a posting list, the postings located after that posting need not be physically moved owing to the large object management scheme. In conventional inverted index structures, postings move due to storage space expansion upon document addition. Shrinkage upon document deletion has not been considered in these structures.

Second, we can enhance the performance of updating the inverted index upon document addition, deletion, and modification. Using the subindex, we can efficiently maintain the docID-order in the posting list by quickly locating the slot in the posting list for the posting of the added document. Similarly, we can quickly locate the posting of the deleted document in the posting list using the subindex. As most documents contain keywords with a long posting list, quick addition and removal of postings in a long posting list is important for the performance of updating the inverted index.

Third, we can enhance performance of checking whether a specific document contains a specific keyword. This is done by checking through the subindex the existence of the docID of the document in the posting list of the keyword. Fourth, by maintaining the docID order in the posting list, we can efficiently process arbitrary boolean expressions containing more than one keyword. This is done by sequentially scanning and merging the posting lists of the keywords only once.

Fifth, we can process the integrated query of database retrieval and information retrieval in a tightly coupled manner as descibed above. Conventional inverted index dealt with only information retrieval, but did not address the problem of processing integrated queries of database retrieval and information retrieval.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An inverted index storage structure comprising:
   a plurality of large objects each for storing a plurality of posting lists, each of said large objects being indexed according to a keyword input when said posting lists therein correspond to said keyword input; and
   a plurality of subindexes, each of said subindexes being one-to-one connected to each of said posting lists to index a document identifier thereto.

2. An inverted index storage structure as set forth in claim 1, wherein each of said subindexes indirectly points to each of said posting lists using an offset array when indexing said document identifier.

3. An inverted index storage structure as set forth in claim 1, wherein said subindexes are selectively connected to ones of said posting lists with lengths exceeding a predetermined value.

4. An inverted index storage structure as set forth in claim 1, wherein each of said posting lists includes a posting that stores together an object identifier and said document identifier besides extracted position information.

5. A method of inserting a new posting in an inverted index storage structure which includes a plurality of large objects each for storing a posting list, each of said posting lists having a posting that stores together an object identifier and a document identifier besides extracted position information, and a plurality of subindexes, each of said subindexes being one-to-one connected to each of said posting lists to indirectly index said document identifier thereto using an offset array, comprising the steps of:

(a) checking whether said offset array has space insufficient for storage of said new posting;

(b) enlarging the size of said offset array by double if it is checked at said step (a) that said offset array has space insufficient for storage of said new posting;

(c) allocating an empty element of the offset array for said new posting if it is checked at said step (a) that said offset array has space sufficient for storage of said new posting or after the size of said offset array is enlarged by double at said step (b), and checking whether said document identifier of said new posting is larger than the existing document identifiers;

(d) adding said new posting to the end of the corresponding posting list if it is checked at said step (c) that said document identifier of said new posting is larger than the existing document identifiers;

(e) traversing said subindex to determine a new byte offset, if it is checked at said step (c) that said document identifier of said new posting is not larger than the existing document identifiers, and inserting said new posting into the determined byte offset; and (f) recording a byte offset of said new posting on said allocated element of said offset array after said new posting is added or inserted at said step (d) or (e), correcting byte offsets, recorded on the associated elements of said offset array, of postings with byte offsets changed and inserting said document identifier of said new posting and the array index of said allocated element of said offset array into the corresponding subindex.

6. A method of deleting a posting in an inverted index storage structure which includes a plurality of large objects each for storing a plurality of posting lists, each of said posting lists having a posting that stores together an object identifier and a document identifier besides extracted position information, and a plurality of subindexes, each of said subindexes being one-to-one connected to each of said posting lists to indirectly index said document identifier thereto using an offset array, comprising the steps of:

(a) traversing said subindex to find the storage position of the posting including the identifier of the deleted document and deleting said posting including said identifier of said deleted document from the corresponding posting list;

(b) removing the element of said offset array corresponding to said deleted posting and correcting byte offsets, recorded on the associated elements of said offset array, of postings with byte offsets changed; and (c) deleting the subindex entry pointing to said offset array element corresponding to said deleted posting.

7. A method of retrieving a posting or a posting list in an inverted index storage structure which includes a plurality of large objects each for storing a plurality of posting lists, each of said posting lists having a posting that stores together an object identifier and a document identifier besides extracted position information, and a plurality of subindexes, each of said subindexes being one-to-one connected to each of said posting lists to indirectly index said document identifier thereto using an offset array, comprising the steps of:

(a) traversing the keyword index and finding the posting list corresponding to the given keyword;

(b) checking whether the identifier of a specific document is given as input;

(c) traversing the subindex connected to the posting list of the given keyword to find the postings of said specific document so as to check whether the given keyword is included in said specific document, if it is checked at said step (b) that said specific document identifier is given as input, and returning the found postings of said specific document; and (d) sequentially scanning the found posting list stored in a large object to return postings of all documents from which the given keyword is extracted, if it is checked at said step (b) that no specific document identifier is given as input.

8. A database system structure that has an inverted index storage structure that includes a plurality of large objects each for storing a plurality of posting lists and a plurality of subindexes, each of said posting lists having a posting that stores an object identifier and a document identifier besides extracted position information, and each of said subindexes being one-to-one connected to each of said posting lists to indirectly index said document identifier thereto using an offset array, and that comprises a plurality of database objects each including attributes such as a document identifier, a document number, a creator, a creation date and text, each of said database objects being physically one-to-one matched with a posting by using said document identifier and an object identifier as pointers to reference each other.

9. A method of tight coupling information retrieval with a database management system which comprises an inverted index storage structure including a plurality of large objects each for storing a posting list, each of said posting lists having a posting to store an object identifier, a document identifier and extracted position information, and a plurality of subindexes, each of said subindexes being one-to-one connected to each of said posting lists to indirectly index said document identifier thereto using an offset array, and a database system structure including a plurality of database objects each including attributes such as a document identifier, a document number, a creator, a creation date and text, each of said database objects being physically matched with a posting by using said document identifier and an object identifier as pointers to reference each other, comprising:

a new posting insertion mode of enlarging the size of said offset array by double if said offset array has space insufficient for storage of a new posting, allocating an empty element of the offset array for said new posting if said offset array has space sufficient for storage of said new posting or after the size of said offset array is enlarged by double, adding said new posting to the end of the corresponding posting list if said document identifier of said new posting is larger than the existing document identifiers, traversing said subindex to determine a new byte offset, if said document identifier of said new posting is not larger than the existing document identifiers, inserting said new posting into the determined byte offset, recording a byte offset of said new posting on said allocated element of said offset array, correcting byte offsets, recorded on the associated elements of said offset array, of postings with byte offsets changed, and inserting said document identifier of said new posting and the array index of said allocated element of said offset array into the corresponding subindex;

a posting deletion mode of traversing said subindex to find the storage position of the posting including the identifier of the deleted document, deleting said posting including said identifier of said deleted document from the corresponding posting list, removing the element of said offset array, corresponding to said deleted posting, correcting byte offsets, recorded on the associated elements of said offset array, of postings with byte offsets changed, and deleting the subindex entry pointing to said offset array element corresponding to said deleted posting;

a posting or posting list retrieval mode of traversing the keyword index, finding the posting list corresponding to the given keyword, checking whether the identifier of a specific document is given as input, traversing the subindex connected to the posting list of the given keyword to find the postings of said specific document so as to check whether the given keyword is included in said specific document, if said specific document identifier is given as input, returning the found postings of said specific document, and sequentially scanning the found posting list stored in a large object to return postings of all documents from which the given keyword is extracted, if no specific document identifier is given as input; and an integrated query processing method made possible by storing the object identifier together with the document identifier in each posting, where an integrated query is processed either by first processing the information retrieval part of the query and then processing the database part of the query by accessing the desired database object through the object identifier stored in the posting or by first processing the database part of the query and then processing the information retrieval part of the query by looking for the desired posting through the subindex in the posting list of the given keyword.

* * * * *